(12) United States Patent
Köhler et al.

(10) Patent No.: US 6,472,479 B1
(45) Date of Patent: Oct. 29, 2002

(54) SULFONATED BEAD POLYMERS PREPARED FROM STYRENE, VINYLPYRIDINES, AND CROSSLINKERS

(75) Inventors: Burkhard Köhler; Rüdiger Seidel, both of Leverkusen; Olaf Halle; Eckhard Wenz, both of Köln, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 253 days.

(21) Appl. No.: 09/641,272

(22) Filed: Aug. 17, 2000

(30) Foreign Application Priority Data

Aug. 25, 1999 (DE) .......................................... 199 49 464

(51) Int. Cl.[7] .................................................. C08F 8/36
(52) U.S. Cl. ...................................................... 525/344
(58) Field of Search .......................................... 525/344

(56) References Cited

U.S. PATENT DOCUMENTS 4,365,023 A  12/1982  Fujimoto et al. ............. 521/32
4,419,245 A  12/1983  Barrett et al. ................ 210/681
5,248,435 A   9/1993  Morita et al. ................ 210/681

OTHER PUBLICATIONS

Journal of Membrane Science, NL, Elsevier Scientific Publ. Company, Amsterdam, vol. 71, NR. 1/02, pp. 129–137, XP000453664, ISSN: 0376–7388, L. Liang et al, "Charge–Mosaic Membrane From Gamma–Irradiated Poly(Styrene–Butadiene–4–Vinylpyridine) Triblock Copolymer II Preliminary Dialysis Test" Database Compendex Online! engineering Information, Inc., /New York, NY, US; Database.

Accession No. EIX94021779969, XP002155281, Zusammenfassung, & React Polym; Reactive Polymers Oct. 1993, Bd. 21, Nr. 1–2, Oct. 1993, Seiten 77–88, M. Chanda et al, "Selective Chromate Recovery With Quaternized Poly(4–Vinylpyridine)".

*Primary Examiner*—Christopher Henderson
(74) *Attorney, Agent, or Firm*—Joseph C. Gil; Richard E. L. Henderson

(57) ABSTRACT

The invention relates to sulfonated bead polymers prepared from styrene, vinylpyridines, further monomers, and crosslinkers, to a process for preparing them, and to their use as cation exchangers.

5 Claims, No Drawings

SULFONATED BEAD POLYMERS PREPARED FROM STYRENE, VINYLPYRIDINES, AND CROSSLINKERS

BACKGROUND OF THE INVENTION

The invention relates to the sulfonation products of bead copolymers prepared from styrene, vinylpyridines, and crosslinkers, to a process for preparing them, and to their use as cation exchangers.

Cation exchangers are described in "Ion Exchange", *Kirk-Othmer Ency. Chem. Tech.*, 3rd edition, Vol. 13, pages 678–705.

A problem of sulfonic acid functional cationic exchangers is the oxidative degradation experienced during use under typical conditions. This degradation results in a reduction in the degree of crosslinking, instances of contamination of the water to be deionized, and corrosion problems. In particular, the conductivity of the eluted water is raised by the decomposition products.

The associated problems, and attempted solutions, are described in U.S. Pat. No. 5,302,623 and in EP-A 366,258.

U.S. Pat. No. 5,302,623 describes copolymers containing para-substituted styrenes instead of styrene. An unsatisfactory aspect of this method is that some or all of the styrene, which is very readily available industrially, must be replaced by p-alkyl-styrenes.

In EP-A 366,258, phenolic antioxidants are added to the cation exchangers. This addition brings with it the disadvantage that such antioxidants are themselves elutable with the passage of time.

The object, therefore, was to prepare oxidatively stable ion exchangers that consist essentially of styrene and contain no low molecular mass additions.

It has surprisingly been found that the sulfonation products of bead polymers prepared from styrene, vinylpyridines, acrylonitrile, and divinylbenzene result in a considerably reduced conductivity of the eluted water relative to the sulfonation products of vinylpyridine-free bead polymers.

SUMMARY OF THE INVENTION

The invention provides a process for preparing bead copolymers comprising (i) forming a suspension of seed polymer and a monomer mixture in a continuous aqueous phase while the seed polymer itself will be obtained by jetting the monomer mixture of components (A) and (B) or (A) and (B) and (C) in an aqueous and adjacent polymerization or the seed polymer is obtained in a heterodisperse or homodisperse suspension of the monomer mixture by stirring or jetting in a continuous aqueous phase using a monomer mixture comprising (A) from 67 to 99.45% by weight (preferably from 79 to 95.9% by weight) of styrene, (B) from 0.5 to 20% by weight (preferably from 2 to 12% by weight) of crosslinkers (preferably divinylbenzene), which optionally are present as an isomer mixture and can contain up to 50% by weight of isomers of ethylstyrenes and up to 10% by weight of isomers of diethyl-benzenes, (C) from 0.5 to 8% by weight (preferably from 1 to 5% by weight) of vinylpyridines, especially vinylpyridines having the general formula (I)

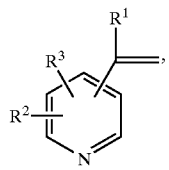

wherein
$R^1$ represents hydrogen or methyl (preferably hydrogen),
$R^2$ and $R^3$ independently of one another represent hydrogen or a $C_1$–$C_4$-alkyl radical (preferably hydrogen) or if $R^2$ and $R^3$ are positioned ortho to one another, together also represent members of a 5- to 7-membered ring, and (D) from 0.1 to 1.1 parts by weight, based on 100 parts by weight of the mixture of components (A)+(B) or (A)+(B)+(C) of a poly-merization initiator, (ii) polymerizing the monomer mixture in the seed polymer or in a heterodisperse or homodisperse suspension to form a copolymerisate and (iii) functionalizing the resulting copolymer by sulfonation.

if desired, after process step (i), the seed polymer can be swollen in a monomer mixture comprising vinylpyridine, crosslinker, and free-radical initiator.

The invention further provides the products prepared by sulfonating the polymers of the invention.

The invention further provides for the use of the sulfonation products of the invention as cation exchangers.

DETAILED DESCRIPTION OF THE INVENTION

The bead polymers are prepared in aqueous suspension by single-stage or multistage processes as are described in Helfferich, *Ion Exchange*, McGraw-Hill Book Co., Inc., pages 26–47 (1962), in *Polymer Processes*, Interscience Publishers, Inc., New York, pages 69 to 109, in EP-B 98,130, in EP-B 101,943, in DE-A 198 52 667.9, and in DE-A 198 20 049.0.

Processes for sulfonation are described in Helfferich, *Ion Exchange*, McGraw-Hill Book Co., Inc., pages 26 to 47 (1962), in EP-A 826,704, and in DE-A 198 52 667.9.

Components (B) for the purposes of the invention are di- or trialkenylbenzenes, such as, for example, all isomers of divinylbenzenes, of trivinylbenzenes, of diisopropenylbenzenes, and of triisopropenylbenzenes.

Examples of component (C) are 2-vinylpyridine, 4-vinylpyridine, and vinylquin-olines, preferably 2-vinylpyridine or 4-vinylpyridine.

Component (C) can be added homogeneously in the whole bead polymer or, for seed feed processes, can be added in the seed and/or in the feed.

In addition to components (A), (B), and (C) it is possible, if desired, to use further monomers. Further monomers for the purposes of the invention are vinylnaphthalene, ethylstyrene, alpha-methylstyrene, chlorostyrenes, acrylic acid, methacrylic acid, acrylic acid $C_1$–$C_8$-alkyl esters, methacrylic acid $C_1$–$C_8$-alkyl esters, acrylonitrile, methacrylonitrile, acrylamide, methacrylamide, vinyl chloride, vinylidene chloride, or vinyl acetate. These further monomers are used in concentrations of from 0 to 15% by weight, preferably from 2 to 8% by weight. In one particularly preferred embodiment, 4% by weight of acrylonitrile is used.

Polymerization initiators for the purposes of the invention are the initiators customarily used in free-radical addition polymerization. Preference is given to initiators having low solubility in water. Suitable initiators are azo compounds such as azobisisobutyronitrile, peresters, or percarbonates.

The copolymers of the invention from process step (iii) are suitable as starting materials for preparing ion exchangers, preferably cation exchangers, by sulfonating them. The sulfonation products of the invention are suitable as cation exchangers and are superior to prior art products in having a marked superiority in terms of oxidative degradation relative to cation exchangers prepared in accordance with the prior art EP-A 366,258 or U.S. Pat. No. 5,302,623.

EXAMPLES

Measurement of the Conductivity in the Eluate and of the Amount of High Molecular Mass Polystyrenesulfonic Acid 100 ml of filter-moist cation exchanger in the H form are introduced into a glass column having a length of 60 cm and a diameter of 2 cm held at 70° C. 480 ml of deionized water are passed through the column from top to bottom at a flow rate of 20 ml/h (0.2 bed volumes/h). The conductivity of the eluate is measured in $\mu$S/cm. In addition, the amount of high molecular mass polystyrenesulfonic acids (MW greater than 4000) in mg/l is measured by gel permeation chromatography using calibration substances.

Example 1 (Inventive)

a) Preparation of the Seed

The procedure described in DE-A 198 52 667.9, Example 2a, was followed.

To 1960 ml of deionized water introduced into a 4 liter glass reactor were added 630 g of a microencapsulated mixture of 1.0% by weight of divinyl-benzene, 0.6% by weight of ethylstyrene (used as a commercially available mixture of divinylbenzene and ethylstyrene containing 63% by weight of divinylbenzene), 0.5% by weight of tert-butyl peroxy-2-ethyl-hexanoate, and 97.9% by weight of styrene, where the microcapsule consisted of a formaldehyde-hardened complex coacervate of gelatin and an acrylamide-acrylic acid copolymer. The mean particle size was 231 $\mu$m. A solution of 2.4 g of gelatin, 4 g of sodium hydrogen phosphate dodecahydrate, and 100 mg of resorcinol in 80 ml of deionized water was added to the mixture, which was stirred slowly and polymerized for 10 hours at 75° C. with stirring. The polymerization was then completed by increasing the temperature to 95° C. The batch was washed through a 32 $\mu$m sieve and dried, giving 605 g of a spherical, microencapsulated polymer having a smooth surface. The polymers appeared optically transparent; the mean particle size was 220 $\mu$m. The seed polymer had a volume swelling index of 4.7 and a soluble content of 0.45%.

b) Preparation of a Copolymer 300.2 g of seed polymer from 1 (a) and an aqueous solution of 1100 g of deionized water, 3.6 g of boric acid, and 1 g of sodium hydroxide were introduced into a 4 liter glass reactor, and the stirring speed was set to 220 rpm (revolutions per minute). Over the course of 30 minutes, a mixture of 731 g of styrene 119.2 g of divinylbenzene (80.6%; remainder being ethyl-benzene; isomer mixture), 48 g (4% by weight of the bead polymer) of 2-vinylpyridine and 7.2 g of dibenzoyl peroxide (75% by weight, water-moist) was added. The mixture was stirred at room temperature for 60 minutes, during which the gas space was flushed with nitrogen. A solution of 2.4 g of methylhydroxyethylcellulose in 120 g of deionized water was then added. The batch was then heated to 63° C. and left at this temperature for 10 hours and subsequently warmed at 95° C. for 2 hours. After cooling, the batch was washed thoroughly with deionized water through a 40 $\mu$m sieve and then dried at 80° C. for 18 hours in a drying cabinet, giving 1168 g of a bead polymer.

c) Preparation of a Cation Exchanger by Sulfonation 1800 ml of 97.32% strength by weight sulfuric acid were introduced into a 2 liter four-necked flask and heated to 100° C. A total of 400 g copolymer from 1(b) were introduced in 10 portions over the course of 4 hours with stirring. The mixture was then stirred for a further 4 hours at 100° C. After cooling, the suspension was transferred into a glass column. The sulfuric acid was expelled in a column with decreasing concentration, beginning with 90% strength by weight and ending with pure water, giving cation exchanger in protonated form (H form).

The conductivity was 92.3 and the amount of high molecular mass polystyrene-sulfonic acid was 0.5.

Example 2 (Inventive)

The procedure described in Example 1 was followed using 731 g of styrene, 119.2 g of divinylbenzene, and 48 g (4% by weight) of 4-vinylpyridine.

The conductivity was 77 and the amount of high molecular mass polystyrenesulfonic acids was 0.4.

Example 3 (Comparative)

The procedure described in Example 1 was followed using 730.7 g of styrene, 48.3 g of acrylonitrile, and 119.2 g of divinylbenzene.

The conductivity was 104.9 and the amount of high molecular mass polystyrene-sulfonic acids was 1.4.

What is claimed is:

1. A process for preparing bead copolymers comprising
   (i) forming a suspension of a seed polymer and a monomer mixture in a continuous aqueous phase, wherein
   (1) the seed polymer is obtained by jetting a monomer mixture of components (A) and (B) or (A) and (B) and (C) as defined below in an aqueous phase and adjacent polymerization or is obtained in a hetero-disperse or homodisperse suspension of a monomer mixture of components (A) and (B) or (A) and (B) and (C) as defined below by stirring or jetting in a continuous aqueous phase, and
   (2) the monomer mixture comprises
      (A) from 67 to 99.45% by weight of styrene,
      (B) from 0.5 to 20% by weight of crosslinkers, which optionally are present as an isomer mixture and can contain up to 50% by weight of isomers of ethylstyrenes and up to 10% by weight of isomers of diethylbenzenes,
      (C) from 0.5 to 8% by weight of vinylpyridines, and
      (D) from 0.1 to 1.1 parts by weight, based on 100 parts by weight of the mixture of components (A)+(B)+ (C), of a polymerization initiator,
   (ii) polymerizing the monomer mixture in the seed polymer or in a heterodisperse or homodisperse suspension to form a copolymer, and
   (iii) functionalizing the resulting copolymer by sulfonation.

2. A process according to claim 1 wherein the vinylpyridines have the formula (I)

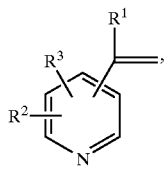 (I)

wherein
$R^1$ represents hydrogen or methyl,
$R^2$ and $R^3$ independently of one another represent hydrogen or a $C_1$–$C_4$-alkyl radical or if $R^2$ and $R^3$ are positioned ortho to one another, together also represent members of a 5- to 7-membered ring.

3. A process according to claim 1 wherein the crosslinkers are di- or trialkenyl-benzenes.

4. A process according to claim 1 wherein the monomer mixture additionally comprises vinylnaphthalene, ethylstyrene, alpha-methylstyrene, chloro-styrenes, acrylic acid, methacrylic acid, acrylic acid $C_1$–$C_8$-alkyl esters, methacrylic acid $C_1$–$C_8$-alkyl esters, acrylonitrile, methacrylonitrile, acryl-amide, methacrylamide, vinyl chloride, vinylidene chloride, or vinyl acetate.

5. A process according to claim 1 wherein the polymerization initiator is azobisisobutyronitrile, a per ester, or a percarbonate.

\* \* \* \* \*